(12) United States Patent
Wilson et al.

(10) Patent No.: US 10,364,174 B2
(45) Date of Patent: Jul. 30, 2019

(54) GLASS FURNACE REGENERATORS FORMED OF ONE-PIECE LOAD-BEARING WALL BLOCKS

(71) Applicants: FOSBEL, INC., Brook Park, OH (US); DSF REFRACTORIES AND MINERALS LIMITED, Derbyshire (GB)

(72) Inventors: Trevor Robert Wilson, Derbshire (GB); Alan Bowser, Brook Park, OH (US); Lou Carolla, Brook Park, OH (US)

(73) Assignees: FOSBEL, INC., Brook Park, OH (US); DSF REFRACTORIES AND MINERALS LIMITED, Derbyshire (GB)

(*) Notice: Subject to any disclaimer, the term of this patent is extended or adjusted under 35 U.S.C. 154(b) by 0 days.

(21) Appl. No.: 15/432,084

(22) Filed: Feb. 14, 2017

(65) Prior Publication Data
US 2017/0240451 A1 Aug. 24, 2017

Related U.S. Application Data

(60) Provisional application No. 62/296,858, filed on Feb. 18, 2016.

(51) Int. Cl.
*C03B 5/00* (2006.01)
*C03B 5/237* (2006.01)
(Continued)

(52) U.S. Cl.
CPC ............ *C03B 5/2375* (2013.01); *F27D 1/042* (2013.01); *F27D 1/08* (2013.01); *Y02P 40/535* (2015.11)

(58) Field of Classification Search
CPC .................................................. C03B 5/2375
See application file for complete search history.

(56) References Cited

U.S. PATENT DOCUMENTS

| 915,195 A | * | 3/1909 | Lodwick | ............. E04B 2/30 |
| | | | | 110/336 |
| 1,699,554 A | * | 1/1929 | Wigglesworth | ...... E04B 1/4185 |
| | | | | 52/564 |

(Continued)

FOREIGN PATENT DOCUMENTS

| AU | 4870490 | 7/1990 |
| DE | 102009045808 | 4/2011 |

(Continued)

OTHER PUBLICATIONS

International Search Report and Written Opinion, PCT/US/2017/017769, May 19, 2017.

*Primary Examiner* — Nathaniel Herzfeld
(74) *Attorney, Agent, or Firm* — Nixon & Vanderhye P.C.

(57) ABSTRACT

Glass furnace regenerators having opposed pairs of side and end walls formed of refractory blocks, wherein at last one of the side and end walls of the regenerator comprise an interlocking plurality of refractory blocks, and wherein the refractory blocks are self-supporting and load-bearing one-piece pre-cast structures of a refractory material. Tie back bars may be provided to operatively connect a wall formed of the refractory blocks to externally provided buckstays to allow relative movement between the refractor blocks forming the wall and the buckstays (e.g., as may be required due to the blocks undergoing thermal expansion during use).

18 Claims, 10 Drawing Sheets

(51) Int. Cl.
*F27D 1/04* (2006.01)
*F27D 1/08* (2006.01)

(56) References Cited

U.S. PATENT DOCUMENTS

| | | | |
|---|---|---|---|
| 1,948,798 A | 2/1934 | Nygaard | |
| 2,109,942 A * | 3/1938 | Dee | F27D 1/04 |
| | | | 52/509 |
| 2,341,971 A * | 2/1944 | Washington | F27D 1/004 |
| | | | 52/506.03 |
| 2,599,236 A | 6/1952 | Cramer et al. | |
| 2,802,749 A | 8/1957 | West et al. | |
| 2,847,849 A * | 8/1958 | Reintjes | E04B 2/56 |
| | | | 110/336 |
| 2,872,328 A | 2/1959 | West et al. | |
| 3,134,199 A * | 5/1964 | Scheffer | F23M 5/06 |
| | | | 264/30 |
| 3,294,509 A | 12/1966 | Soubier et al. | |
| 3,376,681 A * | 4/1968 | Demaison | F27D 1/08 |
| | | | 110/336 |
| 3,763,796 A * | 10/1973 | Venable, Jr. | F27D 1/14 |
| | | | 110/343 |
| 3,912,485 A * | 10/1975 | Green | C03B 5/237 |
| | | | 65/134.6 |
| 4,321,779 A * | 3/1982 | Kratchmer | E04B 2/40 |
| | | | 52/425 |
| 4,763,458 A * | 8/1988 | Wilkinson | F27D 1/002 |
| | | | 52/509 |
| 5,117,604 A * | 6/1992 | Bly | E04F 13/0835 |
| | | | 110/336 |
| 5,137,603 A | 8/1992 | Arthur, Jr. et al. | |
| 5,227,106 A | 7/1993 | Kolvek | |
| 5,277,580 A * | 1/1994 | Miskolczi, Jr. | F27D 1/04 |
| | | | 110/336 |
| 5,423,152 A | 6/1995 | Kolvek | |
| 2011/0291310 A1 | 12/2011 | Calderon Degollado et al. | |
| 2012/0111063 A1 | 5/2012 | Calderon Degollado | |

FOREIGN PATENT DOCUMENTS

| | | |
|---|---|---|
| GB | 833238 | 4/1960 |
| GB | 856830 | 12/1960 |
| WO | WO 2016/004106 | 1/2016 |

* cited by examiner

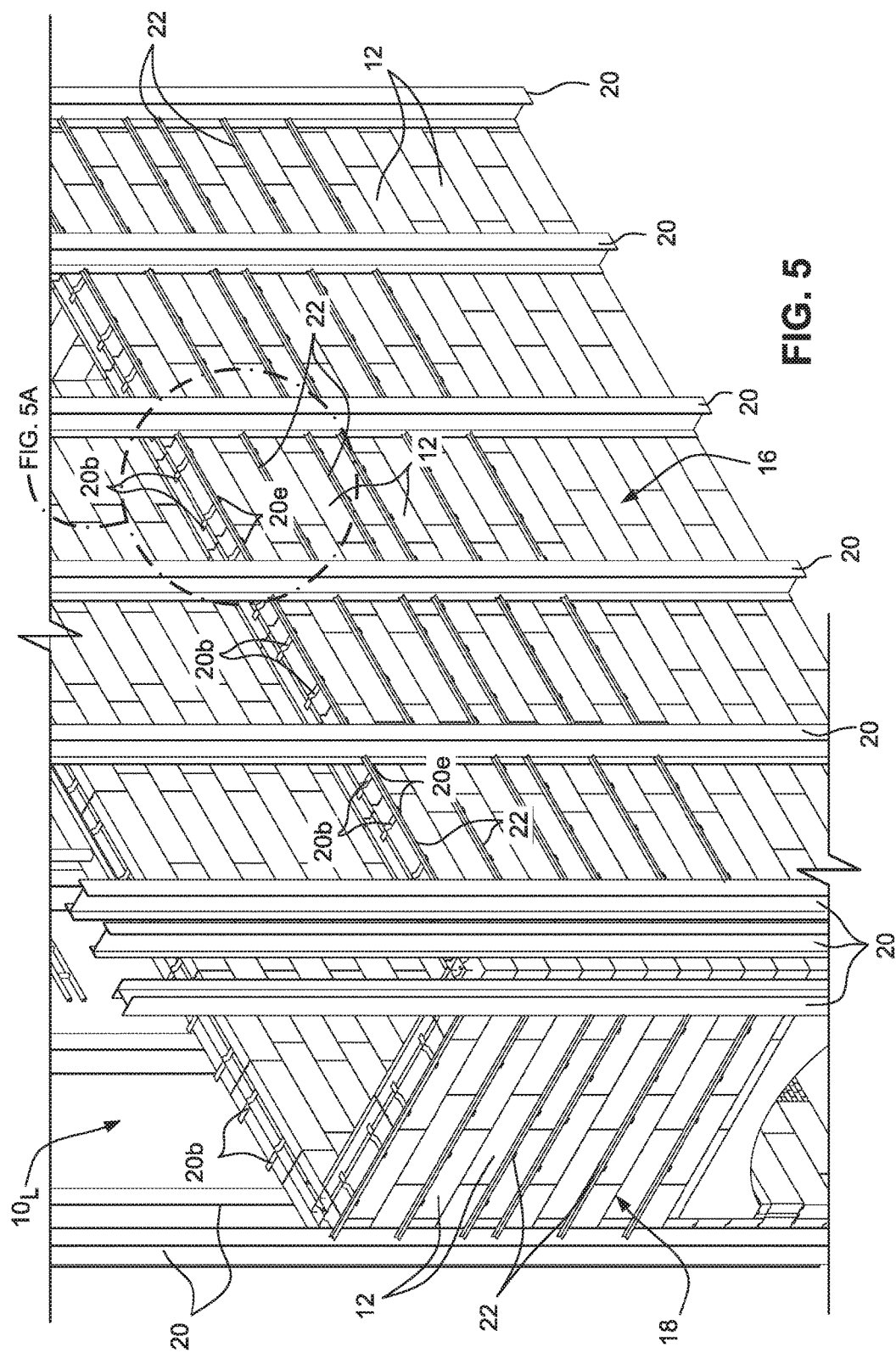

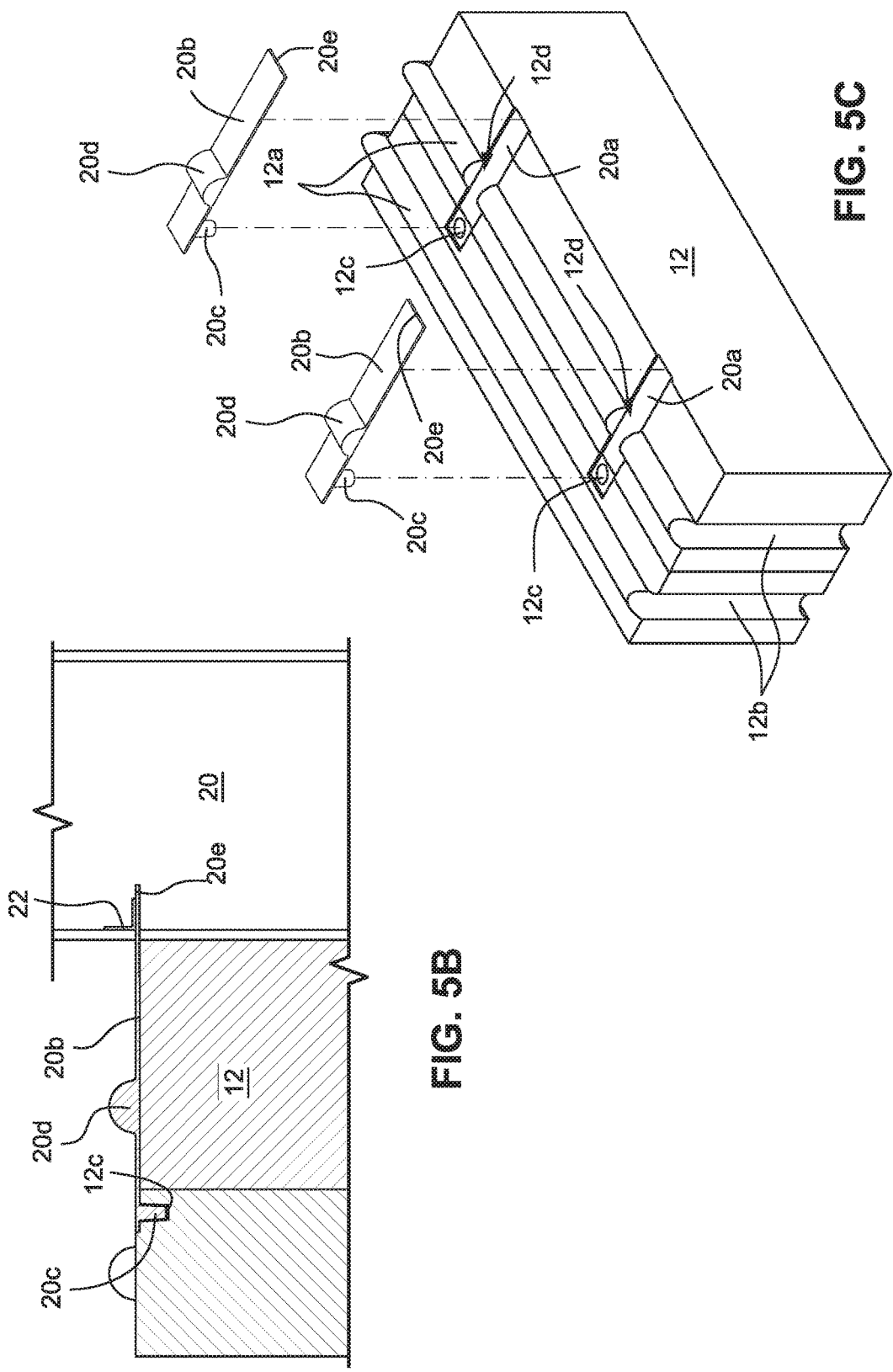

GLASS FURNACE REGENERATORS FORMED OF ONE-PIECE LOAD-BEARING WALL BLOCKS

CROSS-REFERENCE TO RELATED APPLICATION

This application is based on and claims priority benefits from U.S. Provisional Patent Application Ser. No. 62/296,858 filed on Feb. 18, 2016, and is related to copending U.S. Design patent application Ser. No. 29/555,096 filed on Feb. 18, 2016, the entire contents of each such prior filed application being expressly incorporated hereinto by reference.

FIELD

The embodiments disclosed herein relate generally to large load-bearing pre-formed integral (one-piece) refractory components for constructing regenerator structures associated with glass furnaces.

BACKGROUND

In the manufacturing process for making glass, raw materials including sand, lime, soda ash and other ingredients are fed into a furnace, sometimes called a glass tank. The raw materials are subjected to temperature above about 2,800° F. (approximately 1538° C.) in the glass furnace which causes the raw materials to melt and thereby form a molten bed of glass that exits the glass furnace for further downstream processing into glass products.

The most common way of heating the glass furnace is through the combustion of a hydrocarbon fuel source, such as natural gas or oil. The hydrocarbon fuel is mixed with combustion air inside the furnace and combusted to thereby transfer the combustion heat energy to the raw materials and glass melt prior to exiting the furnace.

In order to improve the thermal efficiency of the combustion process, the combustion air used to combust the fuel is preheated by means of regenerator structures. More specifically, a supply of combustion air is preheated in a honeycombed pack of checker bricks contained within the interior of the regenerator structure. More specifically, fresh combustion air is drawn up through the pack of heated checker bricks in the regenerator structure and preheated by means of heat transfer. The pre-heated combustion air may then be mixed with the fuel and combusted. Waste combustion gas exits the glass furnace and passes through a second regenerator structure. As the waste gasses pass through the second regenerator the checkers in the pack are heated by means of heat transferred from the waste gas. After a predetermined time has elapsed (e.g., after about 15-30 minutes), the process cycle is reversed so that the checker bricks in one of the regenerator structures that were being heated by heat transfer with the waste gas are then used to preheat the fresh combustion air while the checker bricks in the other regenerator structures that were used to preheat the combustion air are then re-heated by heat transfer with the waste combustion gas. See in this regard, U.S. Pat. No. 3,326,541 (the entire content of which is expressly incorporated hereinto by reference).

The current process for building glass regenerator structures is very labor intensive taking many weeks as it requires the placement of hundreds of thousands of refractory bricks to be individually coated with mortar and placed. As is well known in the glass making industry, the mortar joints associated with the walls of the regenerator structure are the weakest part of the structure and are consequently more readily susceptible to degradation by chemical attach and mineralogical change caused by the corrosive hot gasses passing through the regenerator. As the brick joints begin to erode, the walls forming the regenerator structure face increased attack as the corrosive gasses begin to condense and react with the refractory materials of the walls thereby weakening the structure. As the structure becomes weakened, the glass furnace itself may become compromised and fail which could then require a complete shut down and rebuilding operation.

It can be appreciated therefore, that if the regenerator structure (e.g., the regenerator walls) could be fabricated from larger refractory blocks, then fewer mortar joints would ensue thereby prolonging the regenerator structure's useful life and minimizing down time due to rebuilding.

SUMMARY

In general, the embodiments disclosed herein are directed toward glass furnace regenerators having monolithic interlocking refractory wall blocks which allow a faster build as compared to conventional refractory wall structures thereby decreasing production down time for the glass manufacturer. According to certain embodiments, opposed pairs of side and end walls are formed of refractory blocks, wherein at last one of the side and end walls of the regenerator comprise an interlocking plurality of refractory blocks, and wherein the refractory blocks are self-supporting and load-bearing one-piece pre-cast structures of refractory materials.

At least some of the refractory blocks may formed of dissimilar precast refractory materials to establish longitudinally adjacent integral regions of the blocks that differ in at least one of melting temperature and thermal conductivity of the refractory material. According to some embodiments, the precast refractory materials establishing the adjacent integral regions of at least some of the refractory blocks have a melting temperature difference of at least about 50° C. and/or the precast refractory materials establishing the integral regions of at least some of the refractory blocks have a thermal conductivity difference of at least about 10%.

Advantageously, the refractory blocks comprise interlocking tongue and grooves.

According to some embodiments, a plurality of adjacent upright buck stays each having an interior flange positioned against an exterior portion of the side walls, with a plurality of rods extending between the adjacent buck stays, wherein the rods have opposed terminal ends that are engaged with an interior flange of the buck stays so as to slide relative to the interior flange. Tie back bars may thus be compressively held between vertically adjacent ones of the refractory blocks with the tie back bars having an end that is rigidly connected to a respective one of the rods. In such embodiments, thermal expansion of the regenerator wall may be accommodated without jeopardizing the structural integrity of the wall in use. In those embodiments whereby the refractory blocks include interlocking tongue and grooves, at least one of the tongues of some blocks may be discontinuous so as to receive therein a portion of a respective tie back bar.

According to certain embodiments, at least some of the refractory blocks comprise latitudinally oriented recessed channels for receiving respective ones of the tie back bars therein. The channels may define a hole which is sized and configured to accept therein a pin dependently extending from a proximal end of a tie back bar. In those embodiments there the block includes a tongue on a top surface thereof, the tongue will be interrupted by the latitudinally oriented recessed channel thereby forming a gap. The tie back bar may therefore be further provided with an intermediate protrusion having a cross-sectional profile corresponding to the tongue so that when the intermediate protrusion is positioned in the gap, it will be aligned with the tongue.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 5 is a perspective view of a partially assembled wall section of the regenerator depicted in FIGS. 1 and 2 and showing the external buck stays associated with such wall section;

FIG. 5B is an enlarged cross-sectional view of the wall section depicted in FIG. 5 as taken along line 5B-5B in FIG. 5A;

FIG. 5C is an exploded perspective view of a representative wall block and tie back bars;

DETAILED DESCRIPTION

Figure 1:
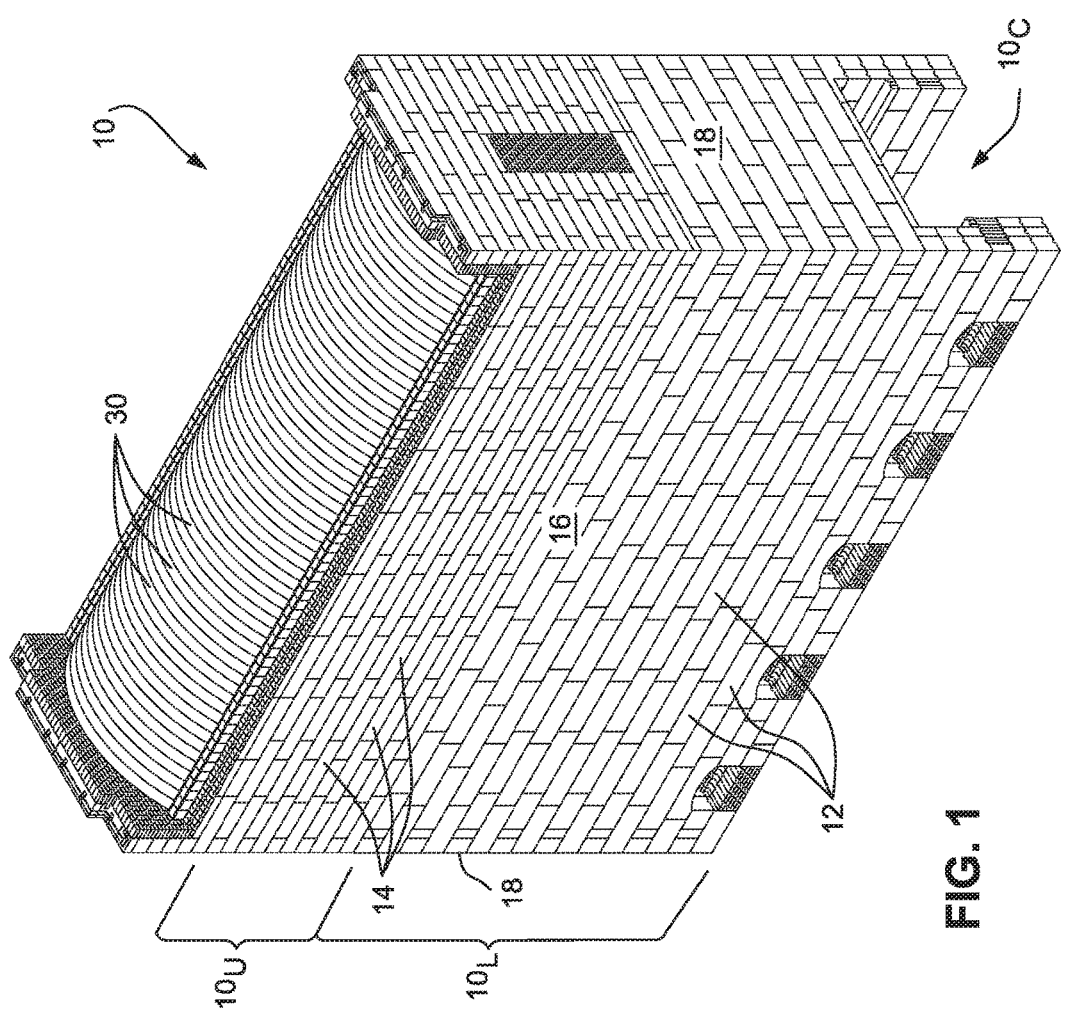
FIG. 1 is a perspective view of a non-furnace side of a regenerator structure that that embodies the one-piece blocks as described more fully herein.
Figure 2:
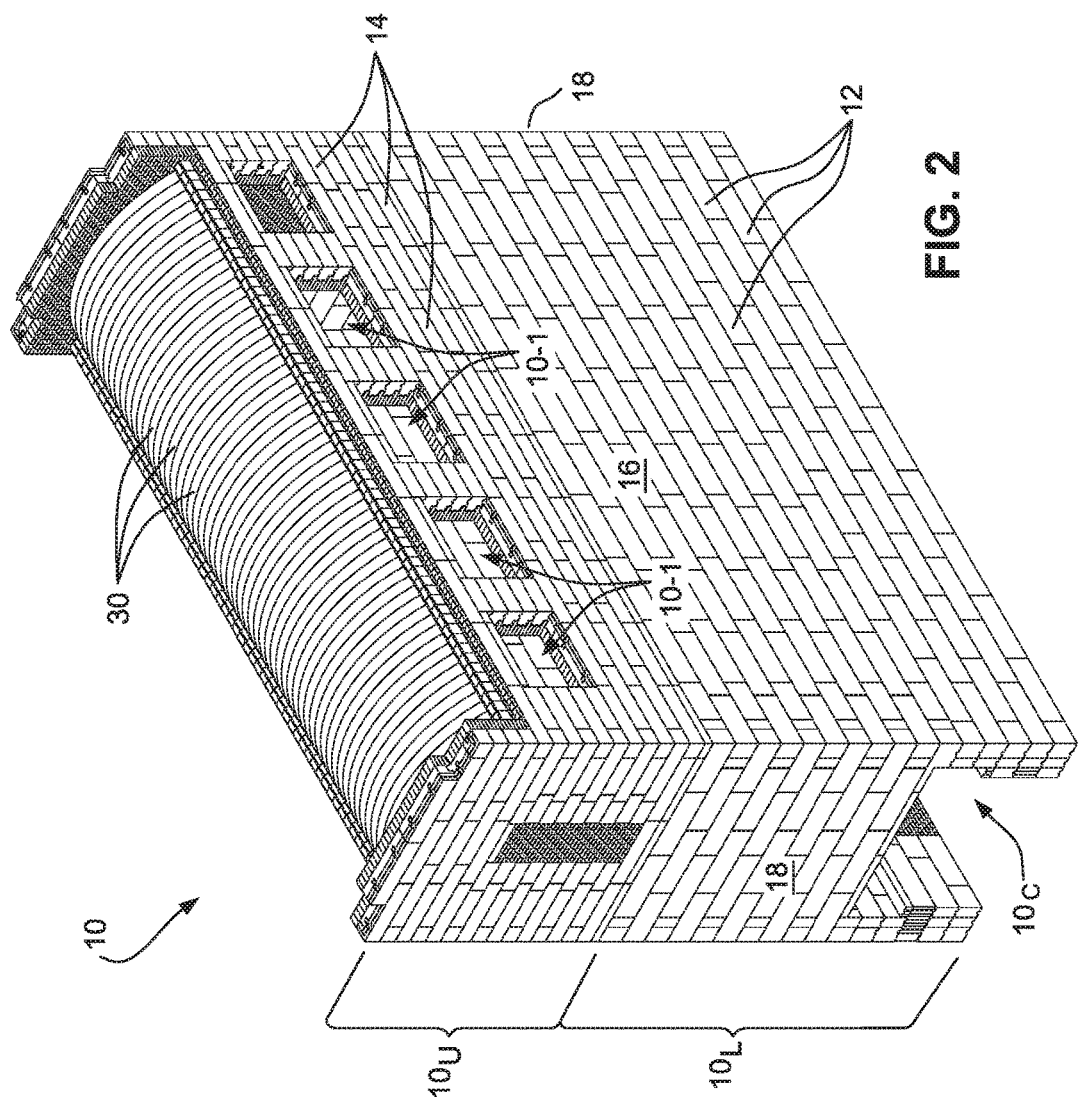
FIG. 2 is a perspective view similar to FIG. 1 but showing the regenerator structure from the furnace side.

Accompanying FIGS. 1 and 2 schematically depict non-furnace side and furnace side perspective views, respectively, of a regenerator structure 10 having a lower wall section 10L constructed of large pre-cast refractory blocks (a few of which are identified by reference numeral 12) and an upper wall section 10U constructed of large pre-cast refractory blocks (a few of which are identified by reference numeral 14) thereby forming opposed pairs of side and end walls 16, 18, respectively. It will be appreciated that the regenerator structure 10 is used in operative combination with a glass furnace (not shown) and that the regenerator structure 10 generally depicted in the accompanying FIGS. 1 and 2 is of a type used for side-fired glass furnaces. However, the attributes of the embodiments of the invention to be described herein are equally applicable to other glass furnace designs, e.g. end-fired glass furnaces.

The regenerator structure 10 includes a series of ports 10-1 which are used to introduce pre-heated combustion air into the glass furnace (not shown) or to exhaust combustion gas from the furnace depending on the operational cycle. The upper wall section 10U of the regenerator structure 10 is capped with a series of adjacently positioned crowns (a representative few of which are noted by reference numeral 30).

Figure 5A:
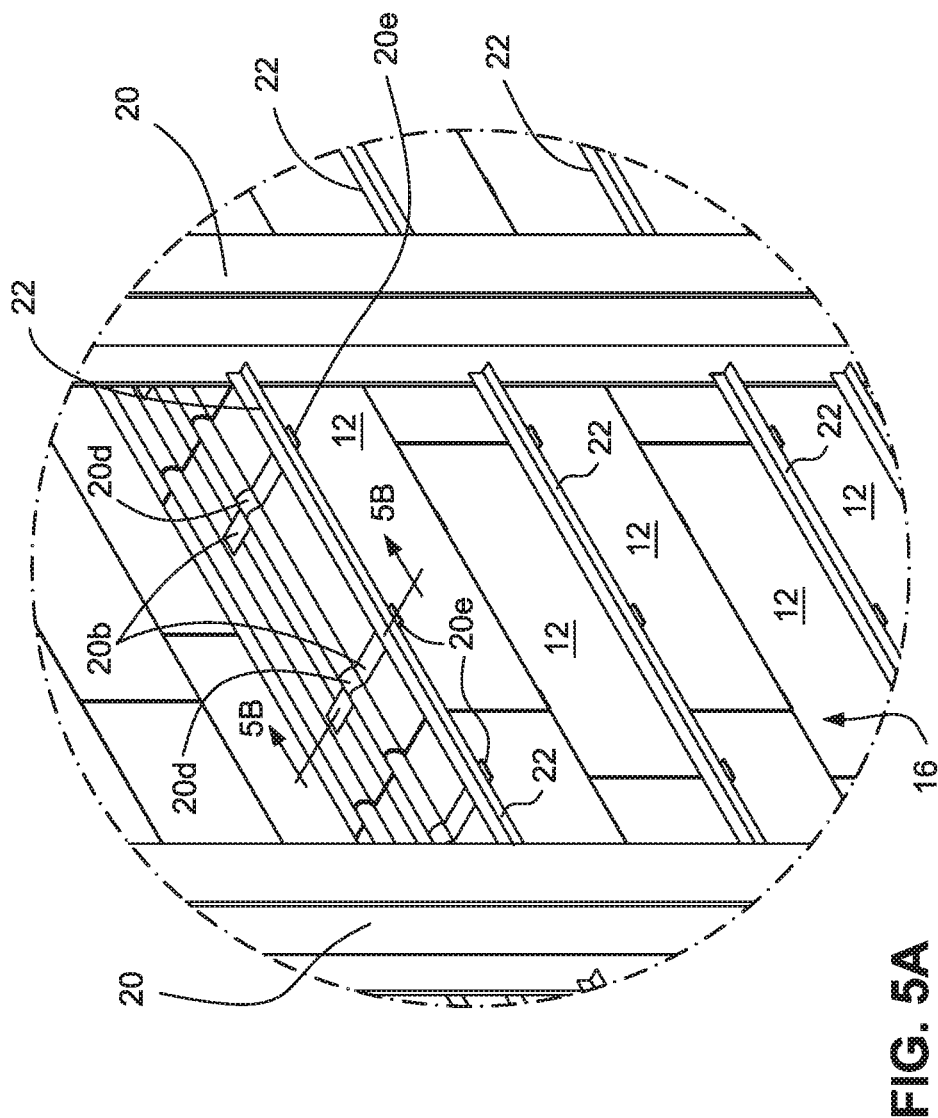
FIG. 5A is an enlarged detailed perspective view of the wall section depicted in FIG. 5.

Although not shown in FIGS. 1 and 2, the walls 16, 18 are structurally supported by external upright structural beams known colloquially as buck stays 20 (see FIG. 5). As is known in the art, the buck stays 20 are compressively held against the walls 16, 18 by means of tie rods (not shown) extending between and interconnecting opposed pairs of buck stays 20 both latitudinally and longitudinally relative to the regenerator structure 10.

Figure 3:
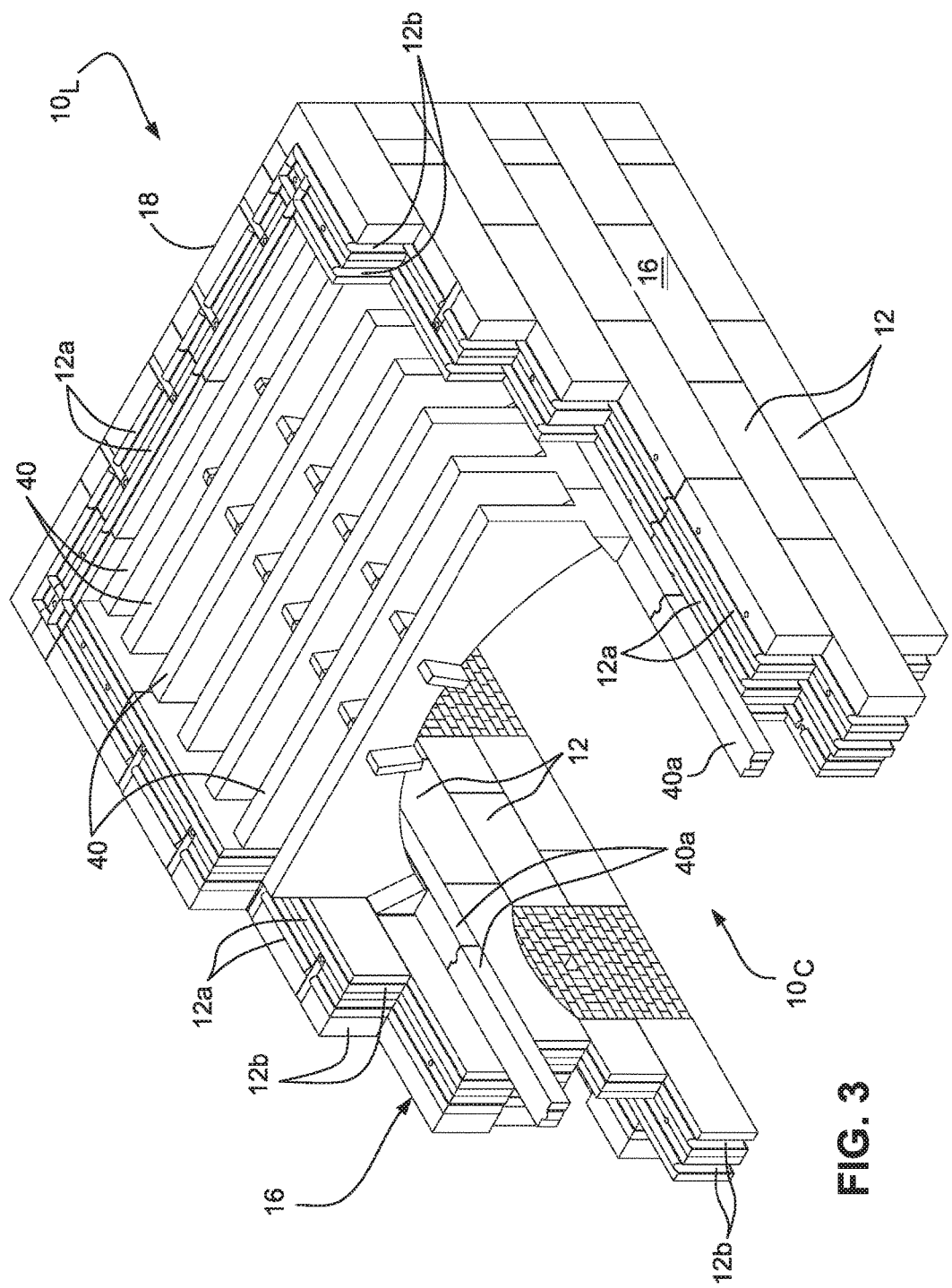
FIG. 3 is a perspective view of a partially assembled lower wall section of the regenerator depicted in FIGS. 1 and 2 which also shows the placement of the rider arches thereon.

The bottom portion of the regenerator structure includes adjacently positioned rider arches 40 (not shown in FIGS. 1 and 2, but seen FIG. 3). The rider arches 40 are thus provided to establish a channel 10C for the ingress/egress of combustion air and gases to/from the regenerator structure 10 and to provide a supporting floor for the checker bricks (not shown) occupying the interior volume of the regenerator structure 10 thereabove.

The various integral (one-piece) refractory blocks 12, 14 forming the walls 16, 18 as well as the crown arches 30, the rider arches 40 and the internal checker bricks (not shown) may be positioned during construction and/or refurbishment of the regenerator 10 by the assembly apparatus and methods described more fully in U.S. patent application Ser. No. 14/859,820 filed on Sep. 21, 2015 (the entire contents of which are expressly incorporated hereinto by reference). Furthermore, the crown arches 30 and the rider arches 40 may be in accordance with those disclosed more fully in U.S. patent application Ser. No. 14/939,210 filed on Nov. 12, 2015 (the entire contents of which are expressly incorporated hereinto by reference).

As is perhaps better seen in FIG. 3, the walls 16, 18 of the lower section 10L of regenerator 10 are formed by relatively large integral pressed blocks 12 that are interlocked with other blocks in the same course and in adjacent courses by mated tongue-and-groove structures (a representative few of the tongues and grooves are identified in FIG. 3 by 12a and 12b, respectively). The blocks 12 may be fabricated of desired width in the lower wall 10L so as to accommodate foundation stringer blocks 40a having respective tongue and groove ends that provide foundation support for the rider arches 40.

Figure 4:
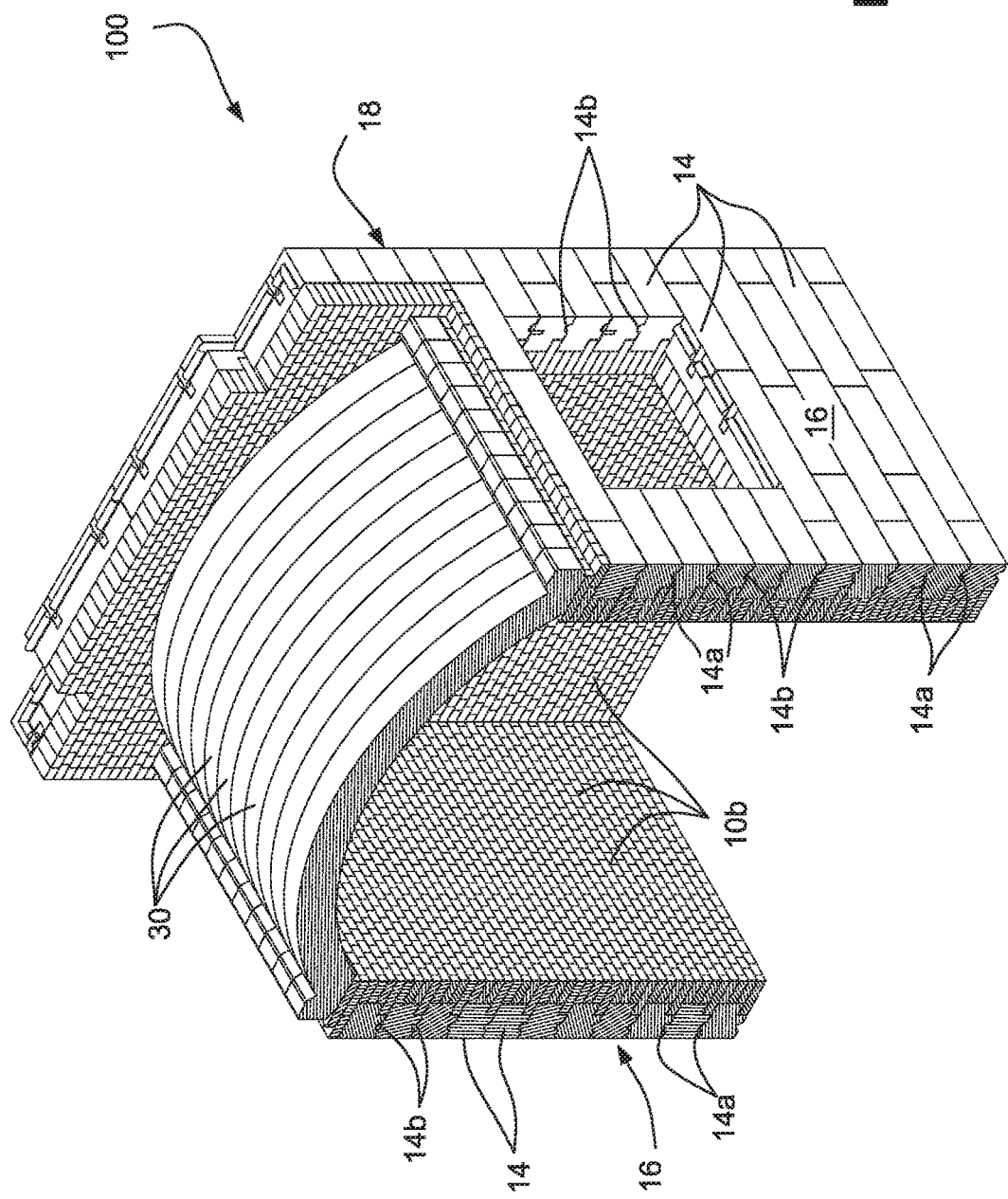
FIG. 4 is a perspective cross-sectional elevational view of an upper wall section of the regenerator depicted in FIGS. 1 and 2 which also shows the placement of the crown arches thereon.

FIG. 4 shows in greater detail a portion of the walls 16, 18 associated with the upper section 10U of the regenerator 10. As is shown, the blocks 14 in the upper section 10U of the walls 16, 18 are of lesser width as compared to the blocks 12 in the lower section 10L of the walls. The interior of the walls 16, 18 at the upper section 10U of the regenerator 10 may thus be lined with relatively smaller refractory bricks (a representative few of which are identified by reference numeral 10B). Similar to the blocks 12, the blocks 14 are interlocked with other blocks in the same course and in adjacent courses by mated tongue-and-groove structures (a representative few of the tongues and grooves are identified in FIG. 3 by 14a and 14b, respectively).

Certain of the blocks 12 and/or 14 may be fabricated so as to facilitate structural interconnection with the buck stays 20. In this regard, tie back bars may be provided so as to operatively connect a wall formed of the refractory blocks 12 and/or 14 to externally provided buckstays 20 to allow relative movement between the refractor blocks forming the wall and the buckstays (e.g., as may be required due to the blocks undergoing thermal expansion during use).

By way of example, FIG. 5 shows some of the blocks 12 in the lower section 10L of the regenerator 10 during construction which are provided with latitudinally oriented recessed tie back channels 20a, each of which receives a respective one of the tie back bars 20b (see FIG. 5C). The tie back bars 20b include a pin 20c dependently extending from a proximal end thereof which is physically received within a correspondingly sized hole 12c formed in the top of the blocks 12 so as to retain the bars 20b in their respective grooves 20a. The tie back bars 20b also include an intermediate protrusion 20d which has a corresponding cross-sectional raised profile to that of the tongues 12a of the blocks 12. As such, when positioned within the recessed channels 20a, the intermediate protrusion 20d of the tie back bars 20b will thereby bridge the gap 12d formed in the tongue 12a by the channels 20a thereby presenting an essentially continuous tongue profile in cross-section (see FIG. 5B). The tie back bars 20b will also be physically held in the recessed channels 20a by virtue of the weight of a superjacent block 12 stacked thereabove.

The exposed distal ends of the tie back bars 20b are rigidly connected (e.g., via welding) to cross-wise adjusting angle rods 22. Each of the adjusting angle rods 22 extends substantially horizontally parallel to the courses of the blocks 12 (or 14) between an adjacent pair of the buck stays 20. The opposed terminal ends of the rods 22 are unconnected to the buck stays 20 but are slideably engaged with an interior flange (relative to the walls 16 and 18) of the buck stays 20 (see e.g., FIG. 5B). In such a manner, therefore, when the blocks 12 (or 14) dimensionally expand when heated in use, the adjusting angle rods 22 are permitted to slideably move in the lengthwise direction of the buck stays 20 thereby allowing the walls 16 and 18 to accommodate such thermal expansion.

Figure 6B:
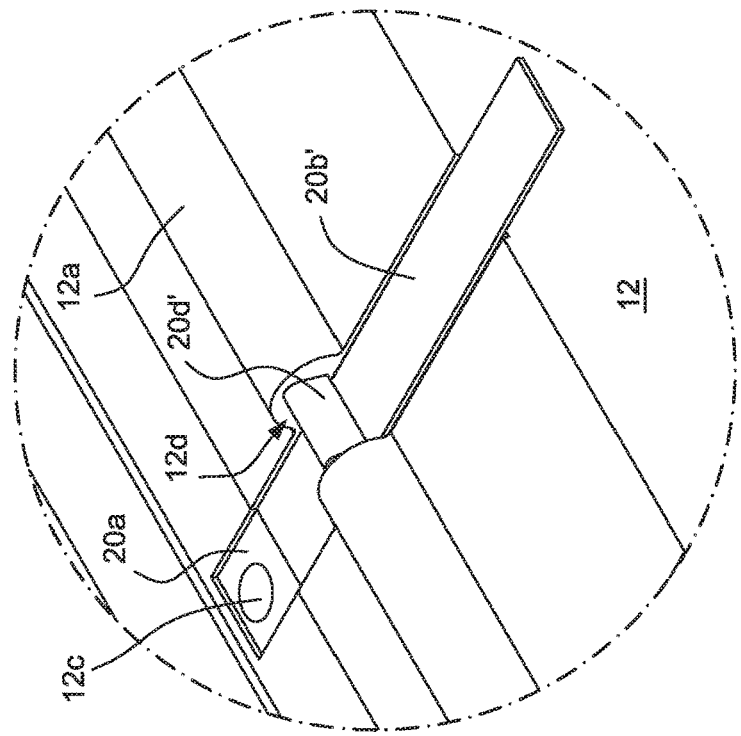
FIG. 6B is an enlarged detailed perspective view of the embodiment of the tie back bars shown in FIG. 6A.
Figure 6A:
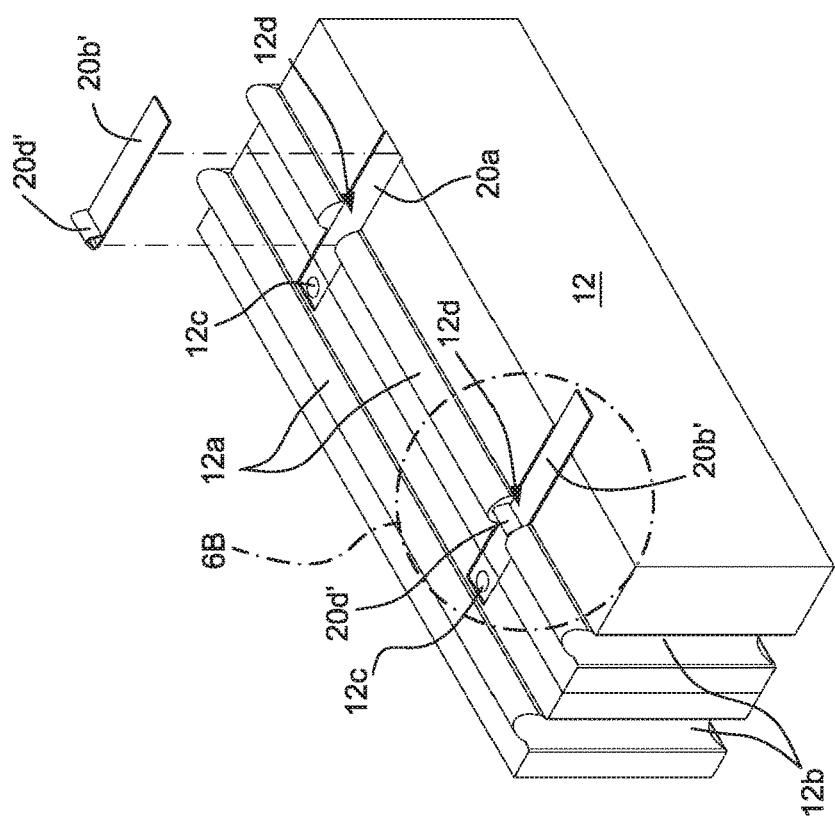
FIG. 6A is a partially exploded perspective view of a representative wall block showing another embodiment of the tie back bars that may be employed in the constructions disclosed herein.

An alternative form of tie back bars 20b' is shown in accompanying FIGS. 6A and 6B as being positioned in the channels 20a of a block 12 and having a proximal turn-back bent end forming a generally triangular protrusion 20d'. The protrusion 20d' has a smaller raised profile as compared to the tongue 12a of the blocks 12 so that when positioned in the channels 20a, the protrusion 20d' will be received by a groove 12b on the bottom surface of a vertically adjacent block 12. Similar to the bars 20b described previously, the distal ends 20e' of the bars 20b' may likewise be rigidly connected (e.g., via welding) to cross-wise rods 22 (not shown in FIG. 6 but see FIGS. 5A and 5B) to allow for vertical positional movement of the blocks 12 relative to the buckstays 20 (e.g., as may occur due to thermal expansion of the blocks 12).

Figure 7A:
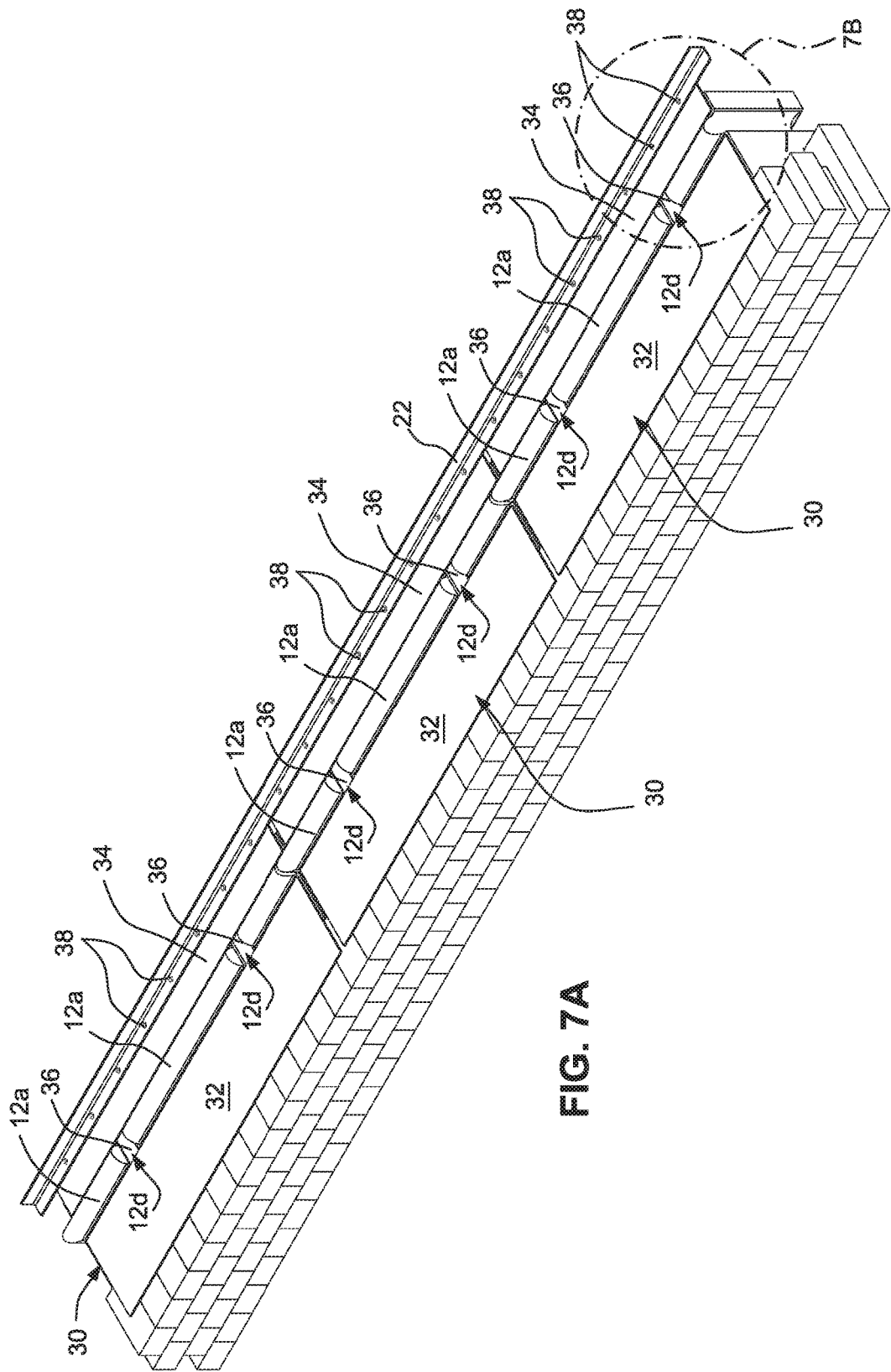
FIG. 7A is a perspective view of a wall section showing yet another embodiment of tie back bars that may be employed in the constructions disclosed herein.
Figure 7B:
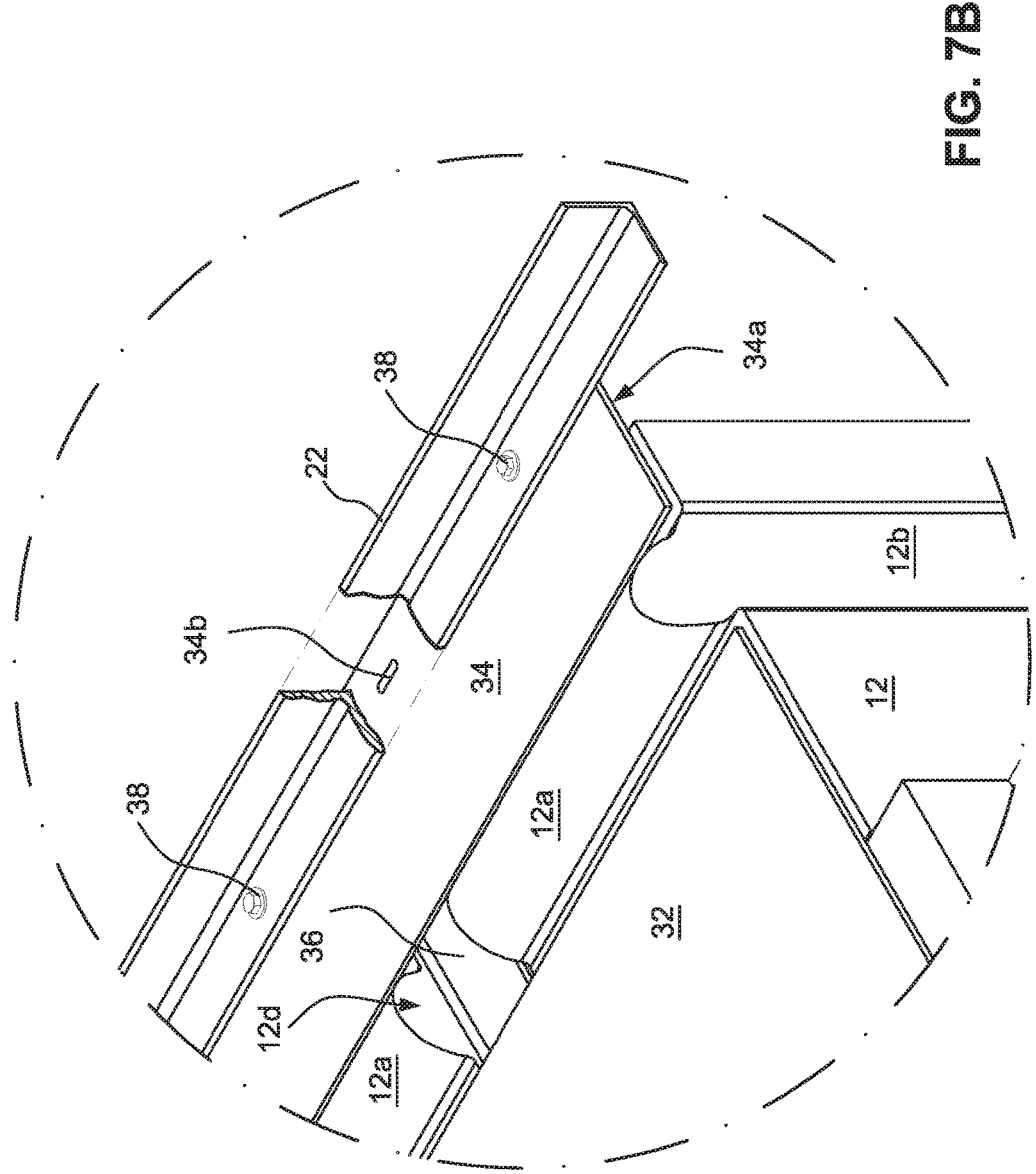
FIG. 7B is an enlarged detailed perspective view of the embodiment of the tie back bars shown in FIG. 7A.

Although FIGS. 5B and 6B depict certain of the blocks 12 as having a transverse groove 20a, it is contemplated that the groove 20a may be omitted from the blocks 12, in which case the tie back bars 20b or 20b' as may be the case will then be fashioned with an intermediate curved section conforming to the contour of the tongue of the block 12. According to such embodiment, therefore, the blocks 12 will have continuous (uninterrupted) tongues along an upper surface thereof with the tie back rods 20b, 20b' being positioned on the top surface of the block 12 such that the curved section thereof conformably receives a subjacent portion of the tongue 12a. In the same manner as noted above, the terminal end of such alternately configured tie back bars 20b, 20b' may be rigidly connected to the angle rods 22. Moreover, the tie back bars 20b and 20b' may be employed together provided that the blocks 12 include the A further alternative tie back bar assembly 30 that may be employed in the embodiments described herein is shown in FIGS. 7A and 7B. In this regard, it will be observed that the tie back assembly 30 is generally comprised of a series of interior and exterior tie back plates 32, 34, respectively that are positioned in an end-to-end manner parallel and adjacent to the discontinuous tongues 12a. The interior and exterior tie back plates 32, 34, respectively are rigidly joined to one another (e.g., via welding) by coplanar bridge plates 36 which are received in a respective gap 12d formed in the discontinuous tongues 12a. In such a manner, therefore, each of the tie back assemblies 30 comprised of interior and exterior tie back plates 30, 34 and the interconnecting bridge plate 36 can be positioned on the top surface of the blocks 12 and compressively held in a fixed position by the weight of blocks 12 stacked thereon.

The exterior plate 34 is preferably dimensioned so that an outer edge portion 34a extends beyond the exterior face of the blocks 12a (see FIG. 7B). The outer edge portion 34a may also be provided with a series of apertures (a representative one of the apertures being shown in FIG. 7B by reference numeral 34b) to allow connection to a cross-wise angle rod 22 extending between adjacent pairs of buckstays 20 for the purpose as already described previously by means of a corresponding series of connectors (e.g., nut and bolt assemblies, a representative few of which are shown in FIGS. 7A and 7B by reference numeral 38). If desired, however, the outer edge portion 34a may of course alternatively or additionally be rigidly connected to the angle rod 22 by welding.

The term "block" as used herein is intended to refer to a generally large sized solid refractory member that requires mechanical assistance for handling and manipulation (e.g., via suitable hoists, lifts and the like). More specifically, a refractory "block" as used herein and the accompanying claims is intended to refer to a refractory member whose weight cannot be lifted manually by a single individual in accordance with generally accepted guidelines according to the US Occupational Safety and Health Administration (OSHA), e.g., typically an object which weighs more than about 50 pounds (22.68 kilograms). A refractory block is therefore to be distinguished from a conventional refractory hand-laid brick since the latter is a small sized solid refractory member that may easily be handled and manipulated by a single individual in accordance with the generally accepted OSHA guidelines, e.g., typically an object weight less than about 50 pounds (22.68 kilograms).

The refractory blocks 12, 14 employed by the embodiments disclosed herein are most preferably formed of a refractory material (e.g., fused silica) that is mechanically pressed and cured at high temperatures (e.g., up to about 1400° C.) as described, for example, in U.S. Pat. Nos. 2,599,236, 2,802,749 and 2,872,328, the entire contents of each such patent being expressly incorporated hereinto by reference. If the refractory block members are of an exceptionally large size (e.g., block members having a size of generally about 25.59 inches (650 mm) or greater), then such blocks may be formed by casting and heat curing a refractory material (e.g., fused silica) as described in U.S.

Pat. Nos. 5,227,106 and 5,423,152, the entire contents of each such patent being expressly incorporated hereinto by reference.

As noted above, the large integral (one-piece) refractory blocks 12, 14 as disclosed herein are pre-cast structures formed of castable refractory materials. The castable refractory materials may have an air permeability of typically about $5\times10^{-15}$ m$^2$ to about $5\times10^{-14}$ m$^2$ (i.e., about 100 times lower than the air permeability for conventional pressed bricks currently used for regenerator walls) as measured according to British Standard (BS) 1902-3.9:1981 (the entire content of which is expressly incorporated hereinto by reference). This relatively low air permeability further reduces penetration by gaseous components in the regenerator thereby also contributing to a reduction of wall corrosion.

The blocks 12 and/or 14 forming the lower and upper wall sections 12, 14, respectively, of the regenerator 10 may be formed monolithically of the same fused refractory material or may include multiple sections formed of different refractory material. For example, according to one embodiment, certain of the blocks may be formed with an exterior longitudinally extending section that is of a dissimilar refractory material as compared to one (or more) interior longitudinally extending sections integrally fused together so as to provide a gradient of thermal insulating properties across the thickness of the block as noted schematically by the different cross-sectional representation of block 12 in FIG. 5B. In this manner, therefore, certain regions of the upper and/or lower wall sections 12, 14 of the regenerator 10 may be fabricated from blocks having a specific thermal insulation property in dependence upon the location of specific blocks in the wall structure.

In those embodiments where a block 12 and/or 14 includes integral sections formed from different refractory materials, it is presently preferred that the fused refractory materials forming each section differ from the fused refractory materials forming integrally adjacent sections by at least one of melting point and/or thermal conductivities. Thus, according to some preferred embodiments, the melting points of the fused refractory materials forming integrally adjacent sections of the blocks 12 and/or 14 will differ by at least 50° C., sometime at least about 100° C. or even at least 150° C., relative to one another. Alternatively or additionally, the thermal conductivities of the fused refractory materials forming integrally adjacent sections of the blocks 12 and/or 14 will differ by at least about 10%, sometimes at least about 20% or even at least about 30%, relative to one another.

The blocks 12 and/or 14 forming the lower and upper wall sections 10L and 10U, respectively, may therefore be "engineered" in order to provide suitable thermal insulating characteristics in dependence of the particular location of the blocks 12 and/or 14 in the wall. Thus, certain of the blocks 12 and/or 14 may be formed of side-by-side longitudinal sections each formed of a different refractory material so as to, e.g., provide a higher melting point and/or higher thermal conductivity material on the exposed "hot face" of the block and a relatively lower melting point and/or lower thermal conductivity material at the back face of the same block. In such a manner, therefore, the integral refractory blocks 12 and/or 14 may be provided as a one-piece unitary block structure which serves the thermal insulating functions that have traditionally required the presence of multiple layers of bricks across the wall thickness of the regenerator structure.

It will be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. A glass furnace regenerator comprising:
opposed pairs of side and end walls, wherein
at least one of the side and end walls of the regenerator comprises an interlocking plurality of refractory blocks each having a dimension of about 25.59 inches (650 mm) or greater and a weight of more than about 50 pounds (22.68 kilograms), and wherein
the refractory blocks are self-supporting and load-bearing one-piece pre-cast structures of a refractory material, wherein the refractory blocks have an air permeability of between about $5\times10^{-15}$ to about $5\times10^{-14}$, and wherein
the refractory blocks comprise longitudinally adjacent integral interior and exterior block regions adjacent an interior and exterior of the regenerator, the interior and exterior block regions being formed of dissimilar pre-cast refractory material having respective thermal conductivity properties that differ by at least about 10% so as to establish a gradient of thermal insulation properties from the interior block region to the exterior block region.

2. The glass furnace regenerator as in claim 1, the precast refractory materials establishing the adjacent integral regions of at least some of the refractory blocks have a melting temperature difference of at least about 50° C.

3. The glass furnace regenerator as in claim 1, wherein the refractory blocks comprise interlocking tongue and grooves.

4. The glass furnace regenerator as in claim 1, further comprising upright buck stays against an exterior portion of the side walls.

5. The glass furnace regenerator as in claim 4, further comprising a plurality of tie back bars positioned between vertically adjacent ones of the refractory blocks.

6. The glass furnace regenerator as in claim 5, wherein at least some of the refractory blocks comprise latitudinally oriented recessed channels for receiving respective ones of the tie back bars therein.

7. The glass furnace regenerator as in claim 6, wherein the channels define a hole, and wherein the tie back bars comprise a dependent pin received in the hole.

8. The glass furnace regenerator as in claim 5, wherein the refractory blocks include a discontinuous tongue on a top surface thereof which defines a gap, and wherein the tie back bar further comprises a protrusion having a raised cross-sectional profile which is positioned in the gap so as to be aligned with the tongue.

9. The glass furnace regenerator as in claim 8, wherein the raised cross-sectional profile is formed by a generally tri-angularly shaped turn-back bent proximal end of the tie back bar.

10. The glass furnace regenerator as in claim 5, wherein the refractory blocks include a tongue on a top surface thereof which is interrupted by a gap, and wherein tie back bars comprise an assembly which includes:
(i) interior and exterior tie back plates each positionable parallel and adjacent to the tongue on the top surface of the block, and
(ii) at least one bridge plate rigidly positioned in the gap of the tongue and rigidly connecting the interior and exterior tie back plates to one another.

11. The glass furnace regenerator as in claim 1, further comprising:

a plurality of adjacent substantially vertically oriented buck stays each having an interior flange positioned against an exterior portion of the side walls;

a plurality of rods extending substantially horizontally between respective ones of the adjacent buck stays, wherein the rods have opposed terminal ends that are slideably engaged with the interior flange of the buck stays to allow the terminal ends thereof to move relative to the adjacent ones of the buck stays in response to thermal expansion of the side walls during use; and a plurality of tie back bars positioned between vertically adjacent ones of the refractory blocks, wherein the tie back bars have a distal end that is rigidly connected to a respective one of the rods.

12. The regenerator as in claim 11, wherein the refractory blocks comprise interlocking tongue and grooves.

13. The regenerator as in claim 12, wherein predetermined blocks include at least one discontinuous tongue defining a gap for receiving a respective one of the tie back bars therein.

14. The glass furnace regenerator as in claim 13, wherein at least some of the refractory blocks comprise latitudinally oriented recessed channels defining the gap in the tongue for receiving respective ones of the tie back bars therein.

15. The glass furnace regenerator as in claim 13, wherein the channels define a hole, and wherein the tie back bars comprise a dependent pin received in the hole.

16. The glass furnace regenerator as in claim 13, wherein the tie back bar further comprises a protrusion having a raised cross-sectional profile which is positioned in the gap so as to be aligned with the tongue.

17. The glass furnace regenerator as in claim 16, wherein the raised cross-sectional profile is formed by a generally triangularly shaped turn-back bent proximal end of the tie back bar.

18. The glass furnace regenerator as in claim 13, wherein the tie back bars comprise an assembly which includes:
(i) interior and exterior tie back plates each positioned parallel and adjacent to the tongue on the top surface of the block, and
(ii) at least one bridge plate rigidly positioned in the gap of the tongue and rigidly connecting the interior and exterior tie back plates to one another.

* * * * *